June 6, 1950 — M. JAKOSKY — 2,510,115
AIRCRAFT SAFETY BELT
Filed March 17, 1947 — 2 Sheets-Sheet 1
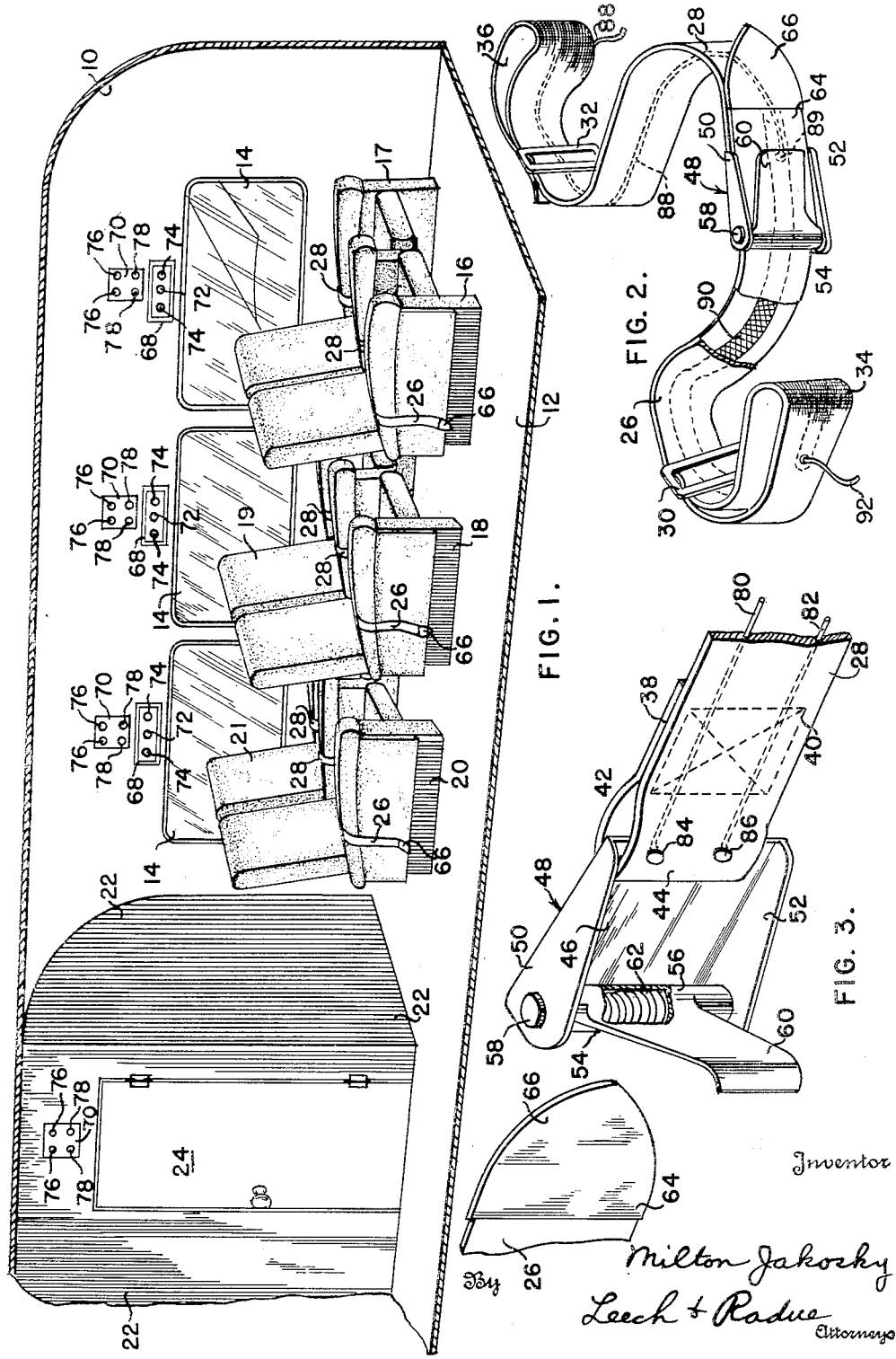
Inventor
Milton Jakosky
By Leech & Radue
Attorneys

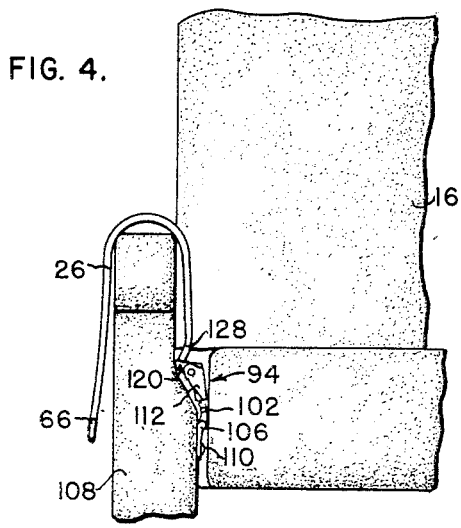
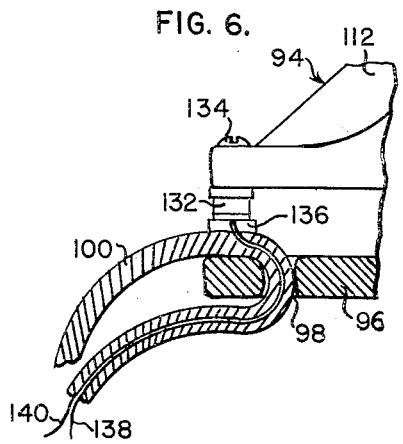
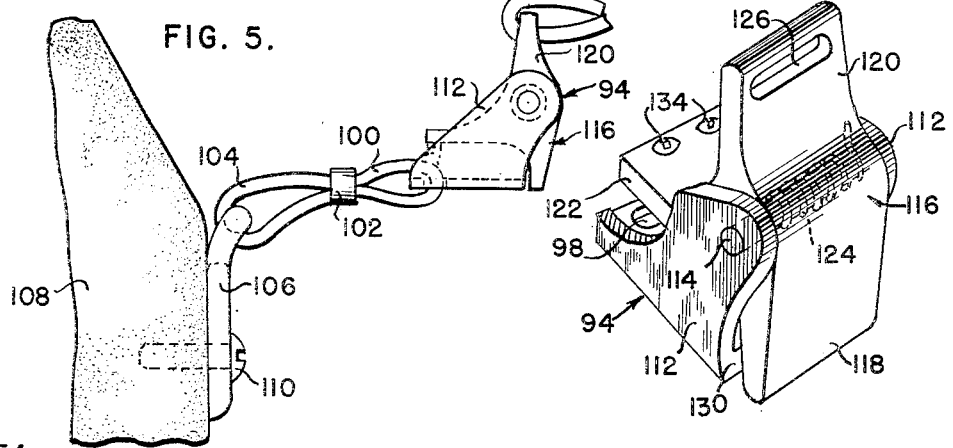
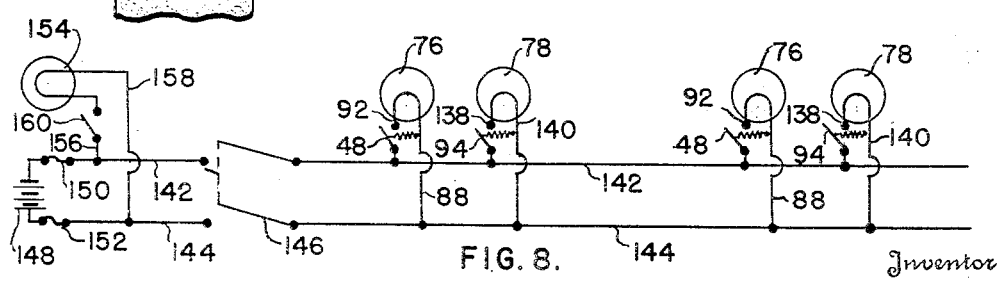

Patented June 6, 1950

2,510,115

UNITED STATES PATENT OFFICE 2,510,115

AIRCRAFT SAFETY BELT

Milton Jakosky, New York, N. Y.

Application March 17, 1947, Serial No. 735,275

5 Claims. (Cl. 177—311)

This invention relates generally to aeronautics and more particularly to a signal system for indicating the operating condition of the usual safety belts or other passenger safety restraining devices in an aircraft.

In the normal course of operation of modern aircraft and particularly in the case of large transport airplanes there are certain critical periods during which all occupants of the aircraft are required to employ safety belts or other restraining devices. Such periods normally occur, for example, in take-off and landing as well as during flight through storms or other rough weather conditions. In the United States of America the use of safety restraining devices at these times is mandatory for all aircraft, civil or military, power or glider, under the regulations of the Civil Aeronautics Administration which has devoted a great deal of attention to this matter and engaged in considerable research relative thereto. In fact, quite recently in an effort to minimize the possibility of occupant injury as a result of forced landings and the like, it has been proposed to increase the strength requirements of the seat belts usually provided, from one thousand and two thousand pound test for one or two persons to fifteen hundred and three thousand pounds, respectively.

As is well-known to those skilled in the art, modern aircraft, particularly of the transport type, have tended to become progressively larger with each new model. One typical large size transport airplane is provided with several individual compartments each having six rows of four seats each on each side of a center aisle, and in addition, it may be provided with private compartments in the nature of drawing rooms or staterooms each having provision for a plurality of passenger seats therein. In practice it is customary for some member of the aircraft crew such as the flight stewardess to individually check each passenger's seat belt to insure that the same is fastened during each of the critical periods referred to above and, as will be readily apparent, where numerous such belts must be inspected several times during a single flight, a considerable amount of the crew member's time is thus consumed. Such inspection may also be complicated in individual cases by the fact that a passenger may be sleeping, covered with a blanket, or occupying a private stateroom, so that visual inspection of each belt is a practical impossibility.

Accordingly, the principal object of the present invention is to provide a safety signal system operatively associated with each of the passenger restraining devices in an aircraft and automatically actuated by operation of the latter in such manner as to enable a crew member to determine at a glance the operating condition of such devices.

Another object of the invention is to provide a safety signal system of the type described which will indicate both when a safety belt is engaged and when it has been drawn taut into proper operating condition.

A further object of the invention is to provide an aircraft embodying a signal system of the type described having a plurality of signal light panels mounted on the aircraft fuselage adjacent the respective passenger seats and private compartments in such manner that they may be readily observed by a crew member.

Additional objects of the invention are to provide a safety signal system of the type described which is electrically actuated and which may be connected to any available source of electric power aboard an aircraft; to provide a buckled flexible safety belt having electrical conductors therein including exposed contacts adjacent the buckle thereof and automatically operable by the latter to open or close the circuit through the conductors whenever the buckle is not engaged; to provide a two-part flexible safety belt embodying a single exposed contact adjacent the end of one part and an elongated exposed contact on one surface of the other part for completing a circuit between the two parts whenever the buckle is engaged; and to provide an aircraft safety belt incorporating a tension switch therein operable to open or close a signal circuit when the belt is drawn up taut into operating condition.

The above as well as other and further objects and advantages of the invention will become more readily apparent to one skilled in the art from a consideration of the following detailed description taken in conjunction with the accompanying drawings illustrating several preferred embodiments thereof wherein:

Fig. 1 is a fragmentary perspective view illustrating a portion of the interior of a typical transport aircraft fuselage at one side of the center aisle thereof;

Fig. 2 is a perspective view of a preferred form of buckled safety belt adapted for use in an aircraft of the type illustrated in Fig. 1 and having a portion broken away to illustrate part of the buckle actuated signal circuit thereof;

Fig. 3 is a fragmentary perspective view of the adjacent free ends of a safety belt illustrating another embodiment of buckle actuated switch;

Fig. 4 is a fragmentary front elevational view illustrating a typical aircraft passenger seat safety belt having a tension actuated switch;

Fig. 5 is an enlarged front elevational view in detail of the tension switch of Fig. 4;

Fig. 6 is a fragmentary cross-sectional view to an enlarged scale illustrating the contact elements of the tension switch of Figs. 4 and 5;

Fig. 7 is a perspective view of the tension switch of Figs. 4 and 5; and

Fig. 8 is a schematic wiring diagram illustrating one form of electrical circuit which my invention may embody in practice.

Referring now in more detail to the drawings and in particular to Fig. 1 thereof, the improved signal system is shown installed within the fuselage of a transport airplane having a sidewall 10 and floor 12 defining a passenger compartment therein. The fuselage sidewall 10 is provided with the usual windows 14 and a plurality of pairs of passenger seats 16, 17, 18, 19, 20, and 21 are mounted on the floor 12 in longitudinally spaced relationship and are permanently secured in the usual manner to fixed portions of the aircraft structure or framework. At the rear of the fuselage I have illustrated a closed compartment 22 constituting a private stateroom having an access door 24. The stateroom 22 may be provided with oppositely facing pairs of seats similar to the seats 16—21 which may, if desired, be convertible into sleeping berths, although it will be understood that the specific type of passenger accommodation to be provided within the stateroom 22 is immaterial for the purposes of the present invention and accordingly has not been illustrated in detail.

In accordance with the usual practice each of the seats 16—21 is provided with a two-part safety belt preferably of the type illustrated in Fig. 2 and comprising a pair of flexible strips of web fabric 26 and 28 having the usual keepers 30 and 32 at one end providing loop portions 34 and 36, respectively, adapted to be attached to fixed portions of the aircraft structure such as the framework at opposite sides of the seats 16—21. As shown particularly in Figs. 2 and 3, the free end 38 of the strip 28 is reversely turned and stitched upon itself as indicated by reference numeral 40 to form a buckle loop 42. The loop 42 is received within an elongated transverse aperture 44 formed in the generally flat rectangular base 46 of a buckle designated generally by reference numeral 48. At its opposite sides the base 46 is provided with a pair of upturned flanges 50 and 52 between which is pivotally mounted a latch 54 having an eccentric cam surface 56 surrounding its mounting shaft 58 and including an operating handle 60 projecting outwardly from the eccentric portion 56. A torsion spring 62 is helically wound about the shaft 58 and is connected between the latter and the eccentric portion 56 in such manner as to tend to rotate the latch 54 to bring the operating handle 60 against the base 46 between the flanges 50 and 52.

The free end 64 of the strip 26 is provided with a relatively rigid tang 66 preferably of plastic material or the like which is firmly attached to the webbing and enables the free end 64 to be readily inserted between the eccentric portion 56 of the latch and the base 46 of the buckle 48 when the two parts of the belt are brought into operative engagement. It will be understood that the free end 64 of the strip 26 is thus firmly gripped between the eccentric portion 56 of the latch and the flat portion 46 of the buckle 48 in such manner that any tension between the two parts of the belt serves only to accentuate the gripping action of the buckle, although the latter may be quickly released at any time by the single motion of raising the operating handle 60.

Referring again to Fig. 1, it will be noted that I have shown a plurality of pairs of panels 68 and 70 mounted in the sidewall 10 of the fuselage adjacent each pair of seats. The lower panels 68 are provided with the usual ventilating ducts 72 and include individual reading lights 74 arranged in conventional fashion thereon. Each of the upper panels 70, however, is provided with a plurality of pairs of signal lights 76 and 78 constituting a part of the signal system to be hereinafter more fully described. It will also be noted that I have provided a similar panel 70 over the door 24 of the stateroom 22 likewise provided with a plurality of pairs of signal lights 76—78.

Referring now to Fig. 3, it will be noted that the strip 28 is provided with a pair of insulated electrical conductors 80 and 82 extending longitudinally thereof and preferably embedded within the body of the web material. The conductors 80 and 82 terminate in a pair of exposed contacts 84 and 86, respectively, located at the outer surface of the buckle loop 42. Since the operating handle 60 of the buckle latch 54 is ordinarily constructed from a steel forging or the like having electrical conducting properties, it will now be apparent that the torsion spring 62 tends at all times to swing the operating handle 60 into engagement with the contacts 84 and 86 to complete an electrical circuit thereacross and thereby connect the conductors 80 and 82. It will also now be apparent that immediately upon lifting the operating handle 60 away from the contacts 84 and 86 to permit the tang 66 of the strip 26 to be inserted into the buckle 48 the circuit through the conductors 80 and 82 will be broken so that any time that the free end 64 of the strip 26 is engaged within the buckle 48 the circuit through conductors 80 and 82 will be broken regardless of the amount of tension in the belt.

Referring to Fig. 2, there is illustrated a slightly different form of switch from that of Fig. 3 in that the switch of Fig. 2 is arranged to provide for completion, rather than interruption, of an electrical circuit whenever the two parts of the belt are engaged. It will be noted in Fig. 2 that only a single conductor 88 is provided in the strip 28 terminating in a single contact 89 similar to the contacts 84—86. The strip 26 of the belt in this case is provided with a relatively broad flat band 90 of a flexible conducting material such as braided wire or the like secured in exposed position longitudinally along an outer surface of the strip 26. The conducting band 90 terminates at the loop 34 and is securely attached in any convenient manner to an insulated conductor 92 which extends away from the belt in a manner similar to the conductor 88. It will now be apparent that in the modified switch arrangement illustrated in Fig. 2 the band 90 will engage the contact 89 at the end of conductor 88 whenever the free end 64 of the strip 26 is in operative position in the buckle 48 and will be held against such contact 89 by the operating handle 60 and torsion spring 62 so as to close the circuit between conductors 88 and 92 at that time regardless of the amount of tension existing within the belt.

Referring now to Figs. 4 to 7, inclusive, I have illustrated another form of switch which may be incorporated in a safety belt in accordance with the present invention, either in place of or in combination with one of the buckle actuated switches. The tension switch is designated generally throughout these views by reference numeral 94 and is seen to comprise a relatively fixed base 96 having a transverse aperture 98 therein adapted to receive one loop 100 of a relatively short strip 102 of flexible web fabric, the opposite end of which is formed as a loop 104 secured to a bracket 106 rigidly joined to a fixed portion of the aircraft structure such as the side 108 of one of the seats 16 by means of machine bolts 110. At its opposite sides the base 96 is provided with upturned ears 112 between which is pivotally mounted on a shaft 114, a relatively movable member designated generally by reference numeral 116. The member 116 is provided with three integral arms 118, 120, and 122, and is urged in a counterclockwise direction, as by means of a torsion spring 124 (Fig. 7). The arm 120 is provided with an elongated aperture 126 therein adapted to receive a belt loop 128 similar to the belt loop 34 previously described in connection with Fig. 2. The arm 118 serves as a stop or limiting member so that after a certain amount of clockwise rotation of the movable member 116 occasioned by the application of a predetermined tensile force through the belt to the point where it is secured or anchored, the arm 118 will abut against the edge 130 of the base 96 to limit further rotational movement of the member 116.

The arm 122 is provided with an inverted V-shape contact spring or bar 132, attached thereto in any convenient manner as by means of screws 134, and adapted to bridge a pair of contacts 136, only one of which is shown in Fig. 6. The contacts 136 are connected to conductors 138 and 140 and are similar in all respects to the contacts 84 and 86 described in connection with Fig. 3. Although I prefer to employ the short fabric strip 102 to connect the switch 94 to the bracket 106, it will be obvious that the switch 94 could be connected directly to the latter, if desired, without departing from the principles of the invention. Furthermore, it will be understood that a conventional, removable pouch or "sock" of flexible fabric, leather, or the like, may be used to enclose the entire tension switch 94 to protect the same against dirt and the like.

In the preferred embodiment of the device, I contemplate the employment in a single safety belt of a tension switch 94 as illustrated in Figs. 4-7, together with a buckle switch of the type illustrated in Fig. 2. I have illustrated in Fig. 8 a typical circuit which may be employed in conjunction with these switches to obtain the desired indication of belt operating condition. As indicated, a pair of conductors 142 and 144 are adapted to be connected as by means of a suitable double pole single throw switch 146 to any convenient source of low voltage electrical energy aboard the aircraft such as that designated by reference numeral 148. The usual line fuses 150 and 152 are provided adjacent the power source 148 to avoid any hazard which might be caused by accidental short circuits. An indicator lamp 154 is connected across the lines 142 and 144 between the power source 148 and the switch 146, by conductors 156 and 158, respectively, and a manually operable single pole single throw switch 160 is interposed in the line 156 for a purpose which will hereinafter be more fully described.

With further reference to Fig. 8, it will be noted that beyond the switch 146 there are a plurality of pairs of signal lights 76—78, which were previously referred to in connection with the description of Fig. 1 and which are illustrated therein as being mounted in the panel boards 70 on the fuselage wall 10 adjacent each pair of seats. In the illustration of Fig. 8 only four of these signal lights 76—78 constituting a single panel 70 have been shown, but it will be understood that the other panels 70 are connected in an identical manner in parallel across the lines 142 and 144. The other elements illustrated in Fig. 8 such as the buckle switch 48 and its conductors 88 and 92 together with the tension switch 94 and its conductors 138 and 140 all correspond exactly with the respective elements illustrated in the figures previously described.

The operation of the device may now be summarized as follows:

Whenever it is necessary for the occupants of the aircraft to fasten their safety belts in flight or prior to take-off or landing, suitable instructions to that effect are ordinarily displayed upon an illuminated panel (not shown) located in an elevated position on the forward fuselage or compartment bulkhead. The occupants of the various seats 16—21 then manually engage the two parts of their safety belts by lifting the operating handle 60 and inserting the free end 64 into the buckle 48 in each case. In the case of the preferred embodiment of Fig. 2, this action immediately results in the completion of an electrical circuit between the conductors 88 and 92 so that if the master switch 146 is closed each of the signal lights 76 will be energized to indicate that the safety belt with which it is associated has been engaged.

In order that the safety belts may operate with maximum efficiency it is desirable that they not only be engaged but also drawn up taut about the body of the occupant so as to produce a very slight residual tension in the belt. It sometimes happens, however, that for various reasons it may not be desirable to immediately draw the safety belt into taut operating position, and, accordingly, the individual tension switches are provided to give an independent indication when each belt has been drawn up taut, by illuminating the signal lights 78 with which they are associated. It is to be noted that a pair of signal lights 76—78 is provided for each of the seats 16—21 so that the crew member charged with the duty of inspecting the safety belts for security can tell by a glance at the panels 70 whether or not a particular belt is engaged and also whether or not it has been drawn up into taut operating condition. When, for example, all of the seats 16—21 are occupied and instructions are given to fasten the safety belts, a continuous upper horizontal line of lights 76 would be illuminated if all of the belts are engaged. Furthermore, if any particular belt is not drawn up taut its associated lower signal light 78 will also be illuminated so that the crew member can direct his attention to that particular occupant.

The operation of the safety belts located adjacent the seats, berths, or other accommodations within the private compartment 22 is identical to that previously described. If these belts are properly adjusted in accordance with the pilot's instructions, the signal lights on the panel 70 above the door 24 will give an identical indication to that of the other panels 70, so that it will be unnecessary for the crew member to disturb the occupants of the compartment 22 for the purpose of inspecting the belts. In the event the modified form of buckle switch disclosed in Fig. 3 is employed instead of the type illustrated in Fig. 2, it will be obvious that the signal lights 76 will be normally off when the belts are engaged, so that with this type switch it will be necessary to inspect any occupied seat corresponding to an illuminated signal light 76.

The signal lamp 154 is preferably located adjacent the operating station of the crew member responsible for checking the safety belts so that by operation of the switch 160 this crew member can tell by a glance at the light 154 whether or not the power source and fuses are in proper functioning order. The master switch 146 will also preferably be located adjacent the same point and will be normally open so that the lines 142—144 need be energized only when it is desired to obtain an indication of belt operating conditions. It will also be apparent that all of the signal lights 76—78 may, if desired, be grouped upon a single panel located adjacent the crew member's station instead of on the individual panels 70 adjacent the seats, without departing from the principles of the invention. The location of such a master panel will obviously be dependent upon the operating procedure of the particular aircraft.

From the foregoing it will be appreciated that the present invention enables the practice of inspecting individual seat belts to be greatly simplified, thereby saving man hours and increasing over-all operating efficiency of the aircraft crew.

An additional advantage will be found in the psychological value of the safety signal system resulting from the knowledge on the part of each passenger that his belt is being checked by a crew member at all necessary times, thus increasing his peace of mind and contributing to a reduction in travel fatigue.

Further advantages of the invention result from the fact that either or both the buckle or tension type switch can be readily installed in existing aircraft, whether new or old, without the necessity of substantially modifying the existing seat structure. Also, it will be noted that my improved tension switch is similar in general principle to the usual safety buckle so that its manufacture by those now engaged in the production of safety belts may be readily undertaken without requiring a substantial amount of additional engineering or production design.

Although a specific form of buckle of commercial manufacture has been used for purposes of illustration, it is intended that "buckle" as used herein shall be interpreted broadly in accordance with dictionary definition, namely, a fastening for two loose ends, as of a belt or a strap.

It is also to be understood that while I have illustrated and described typical aircraft safety belts of the type at present in common usage, such belts optionally may be for one or several persons, or may take the form of safety harnesses or other types of passenger safety restraining devices. Furthermore, any type of signal device may be employed in place of the electric lights disclosed herein as a preferred embodiment, solely for purposes of illustration.

While several preferred embodiments of this invention have been described in detail, it will be understood that numerous changes can be made in size, materials, and arrangement of parts without departing from the principles of this invention as set forth in the appended claims.

I claim:

1. In an aircraft having a passenger seat, a two-part safety belt secured at opposite sides of the seat by one end of each part, a buckle secured to the other end of one part for adjustably fastening the two parts together, said buckle including electrical switch means, electrical contact means forming a part of the belt and arranged for coaction with said electrical switch means, signal means controlled by operation of said electrical switch means to indicate whether the belt is fastened, tension responsive electrical switch means connected to the belt and operable when the belt exerts a predetermined tensile force where it is secured, and electrically operated signal means controlled by the tension responsive means, both said signal means being arranged for simultaneous observation.

2. In an aircraft having a passenger seat, a two-part safety belt secured at opposite sides of the seat by one end of each part, a buckle secured to the other end of one part for adjustably fastening the two parts together, said buckle including electrical switch means, electrical contact means forming a part of the belt and arranged for coaction with said electrical switch means, tension responsive electrical switch means connected to the belt and operable when the belt exerts a predetermined tensile force where it is secured, and electrically operated signal means controlled by the buckle switch means and the tension responsive switch means for indicating satisfaction of both belt safety conditions.

3. In an aircraft having a passenger seat, a two-part, pliable safety belt secured at opposite sides of the seat by one end of each part, a buckle secured to the other end of one part for adjustably fastening the two parts together, said buckle including electrical switch means, electrical contact means forming a part of the belt and arranged for coaction with said electrical switch means, and signal means controlled by operation of said electrical switch means to indicate whether the belt is fastened.

4. In an aircraft having a passenger seat, a safety belt of pliable material having respective ends secured at opposite sides of the seat and adjacent loose ends, a buckle secured to one loose end for adjustably fastening said loose ends together, a tension responsive electrical switch connected to the belt and operable when the belt exerts a predetermined tensile force at the point where one of its ends is secured, and electrically operated signalling means controlled by the operation of said switch.

5. In a vehicle having a passenger seat or berth, an elongated safety restraining device of flexible material secured to the seat or berth and having two loose end portions to extend over and enclose a passenger occupying the seat or berth, buckle means carried by one end portion for adjustably securing the two end portions together, said buckle means including electrical switch means, electrical contact means forming a part of the restraining device and arranged for cooperation with said electrical switch means, and signal means controlled by operation of said electrical switch means to indicate whether the two end portions are secured together.

MILTON JAKOSKY.

REFERENCES CITED

The following references are of record in the file of this patent:

UNITED STATES PATENTS

| Number | Name | Date |
|---|---|---|
| 883,335 | O'Connor | Mar. 31, 1908 |
| 1,657,459 | Davis | Jan. 31, 1928 |
| 1,909,712 | Oppegaard | May 16, 1933 |
| 1,988,330 | Pettersson et al. | Jan. 15, 1935 |
| 2,149,695 | Wilhelm | Mar. 7, 1939 |
| 2,387,625 | Walther et al. | Oct. 23, 1945 |
| 2,399,327 | Cullen | Apr. 30, 1946 |
| 2,420,461 | Capp | May 13, 1947 |